US012612802B2

(12) United States Patent
Sun

(10) Patent No.: US 12,612,802 B2
(45) Date of Patent: Apr. 28, 2026

(54) POINTER TYPE COMBINATION LOCK BOX AND POINTER TYPE COMBINATION LOCK

(71) Applicant: Guangzhou Honglian Network Technology Co., Ltd., Guangzhou (CN)

(72) Inventor: Shuwei Sun, Guangzhou (CN)

(73) Assignee: Guangzhou Honglian Network Technology Co., Ltd., Guangzhou (CN)

( * ) Notice: Subject to any disclaimer, the term of this patent is extended or adjusted under 35 U.S.C. 154(b) by 9 days.

(21) Appl. No.: 18/983,381

(22) Filed: Dec. 17, 2024

(65) Prior Publication Data

US 2026/0043271 A1 Feb. 12, 2026

(30) Foreign Application Priority Data

Aug. 10, 2024 (CN) ......................... 202411094587.7
Sep. 21, 2024 (CN) ......................... 202411319204.1

(51) Int. Cl.
*E05B 37/08* (2006.01)

(52) U.S. Cl.
CPC .................................... *E05B 37/08* (2013.01)

(58) Field of Classification Search
CPC .......... E05B 37/08; E05B 37/04; E05B 37/10; E05B 37/0031; E05B 37/0034
See application file for complete search history.

(56) References Cited

U.S. PATENT DOCUMENTS 1,464,281 A * 8/1923 Jay .......................... E05B 37/00 70/213
8,096,154 B1 * 1/2012 Sechtin .................. E05B 37/16 70/284

* cited by examiner

*Primary Examiner* — Christine M Mills
*Assistant Examiner* — Yahka Sidky
(74) *Attorney, Agent, or Firm* — Jose Cherson Weissbrot

(57) ABSTRACT

The invention relates to a pointer type combination lock box and a pointer type combination lock, which can be applied to bags, doors, safe boxes and other products. The invention adopts the following technical proposal: two or more pointers are used to match with a dial, a plurality of pointers point to combined display codes of scale marks and/or symbol marks on the dial; the invention has the following beneficial effects: due to the use of pointers with the dial, the pointers point to the combined display codes of scale marks and/or symbol marks on the dial, the combinatorial number of the codes forms a series relationship with the number of pointers, a plurality of groups of codes can be combined, the combinatorial number is increased by an order of magnitudes for each increase of a pointer, the codes are displayed intuitively, and has high confidentiality and high cracking difficulty.

10 Claims, 11 Drawing Sheets

POINTER TYPE COMBINATION LOCK BOX AND POINTER TYPE COMBINATION LOCK

TECHNICAL FIELD

The invention relates to a pointer type combination lock box and a pointer type combination lock, which can be applied to bags, doors, safe boxes and other products.

BACKGROUND ART

At present, the combination locks are commonly used for some bags, doors, safe boxes and other products. The mechanical combination locks include button type and rotary disk type, etc., and the rotary disk type combination locks are classified into single-disk type (for the safe boxes) and multi-disk type (for the bags). The single-disk type combination locks are unlocked by forward and reverse rotation, and have the advantages of high confidentiality and high cracking difficulty, and the disadvantages that the code setting is complex, the codes need to be memorized, mistakes are easily made, the error step is not known, all steps have to be repeated and the unlocking codes cannot be intuitively displayed; the single-disk type (for the safe boxes) combination locks also have the defects of inconvenient code change and failure to change any code. Because of its operating principle that the drive disk is fixedly connected with the drive shaft, the latch is inserted into different holes to achieve the purpose of changing the code, the number of latch holes is fixed, that is, a fixed number of groups of codes can only be replaced, generally 7-8 groups. The code groups are fixed at the factory and cannot be changed, equivalently a lock is provided with a fixed number of keys. To achieve a large number of codes, each lock needs to be provided with different structures, that is, lock disc drive bosses correspond to different notches (i.e., the angles are different), so that more locks cannot be unlocked by using the same code. The existing pointer type combination locks adopt the principle. The technologies in the prior arts such as publication number CN20278826U, CN101956494B and CN101956494A lack practicability that it is necessary to open the lock body and the move the pointers for code change, and cannot become practical products. The multi-disc type combination locks have the advantages that the combination lock is simply and easy to use and the unlocking codes are directly displayed, and the disadvantages of weak confidentiality and easy cracking. The personnel in the field can crack the codes in a few minutes, the meaning of the combination lock is almost lost, because the internal lock disc notch can be seen through the rotating disc gap, and the lock disc notch corresponds to the unlocking code. To solve the above problems and defects, a combination lock integrating the advantages of the two locks into a whole and avoiding the shortcomings of the two locks, that is, achieving high confidentiality and intuitive display of unlocking codes, is needed.

SUMMARY OF THE INVENTION

To solve the above defects, the invention aims to provide a pointer type combination lock box and a pointer type combination lock, which is a single disk type and can perfectly solve such defects by using and visually displaying the unlocking code through the pointers. To achieve the above effects and functions, the invention adopts the following technical proposal.

A pointer type combination lock box comprises a box body and a pointer type combination lock, wherein the pointer type combination lock comprises an unlocking key, a latch, a slider, a clutch, a turntable, a dial, a pointer A, a pointer B, a lock disc A, a lock disc B, a drive shaft A and a drive shaft B, the dial is provided with scale marks and or symbol marks, the pointer A is connected with the drive shaft B, the drive shaft B is connected with the lock disc B, the pointer B is connected with the drive shaft A, the drive shaft A is connected with the lock disc A, the drive shaft A is provided with an occlusal boss A, the drive shaft B is provided with an occlusal boss B, interstitial occlusion is adopted between the occlusal boss A and the occlusal boss B, the drive shaft A is provided with a drive phase tooth A, the drive shaft B is provided with a drive phase tooth B, the drive phase tooth A is separated from or occluded with a lock disc phase tooth A through the clutch, the drive phase tooth B is separated from or occluded with a lock disc phase tooth B through the clutch, the latch is connected with the unlocking key, the unlocking key is connected with the slider, the turntable is arranged as a gear ring or a dial cover, and the combination of the scale marks or symbol marks on the dial that the pointer A and the pointer B respectively point to by turning the turntable forwardly and reversely is an unlocking code.

A pointer type combination lock comprises an unlocking key, a latch, a slider, a clutch, a turntable, a dial, a pointer A, a pointer B, a lock disc A, a lock disc B, a drive shaft A and a drive shaft B, the dial is provided with scale marks and or symbol marks, the pointer A is connected with the drive shaft B, the drive shaft B is connected with the lock disc B, the pointer B is connected with the drive shaft A, the drive shaft A is connected with the lock disc A, the drive shaft A is provided with an occlusal boss A, the drive shaft B is provided with an occlusal boss B, interstitial occlusion is adopted between the occlusal boss A and the occlusal boss B, the drive shaft A is provided with a drive phase tooth A, the drive shaft B is provided with a drive phase tooth B, the drive phase tooth A is separated from or occluded with a lock disc phase tooth A through the clutch, the drive phase tooth B is separated from or occluded with a lock disc phase tooth B through the clutch, the latch is connected with the unlocking key, the unlocking key is connected with the slider, the turntable is arranged as a gear ring or a dial cover, and the combination of the scale marks or symbol marks on the dial that the pointer A and the pointer B respectively point to by turning the turntable forwardly and reversely is an unlocking code.

The gear ring is connected with a planetary gear, and the planetary gear is connected with a sun gear, and the drive shaft B is rotated by rotating the gear ring.

The dial cover is fixedly connected with the drive shaft A, and the drive shaft A is rotated by rotating the dial cover.

The drive shaft A and the drive shaft B are arranged as concentric shafts, and are interstitially driven by the occlusal boss A and occlusal boss B.

The symbol marks are numbers or letters or text patterns.

The invention adopts the following technical proposal: two or more pointers are used to match with a dial, a plurality of pointers point to combined display codes of scale marks and/or symbol marks on the dial.

The invention has the following beneficial effects: due to the use of pointers with the dial, the pointers point to the combined display codes of scale marks and/or symbol marks on the dial, the combinatorial number of the code forms a series relationship with the number of pointers, a plurality of groups of codes can be combined, the combinatorial number is increased by an order of magnitudes for each increase of a pointer, the code is displayed intuitively, and has high confidentiality and high cracking difficulty.

BRIEF DESCRIPTION OF THE DRAWINGS

The invention is further described in combination with the drawings and examples below.

Figure 1:
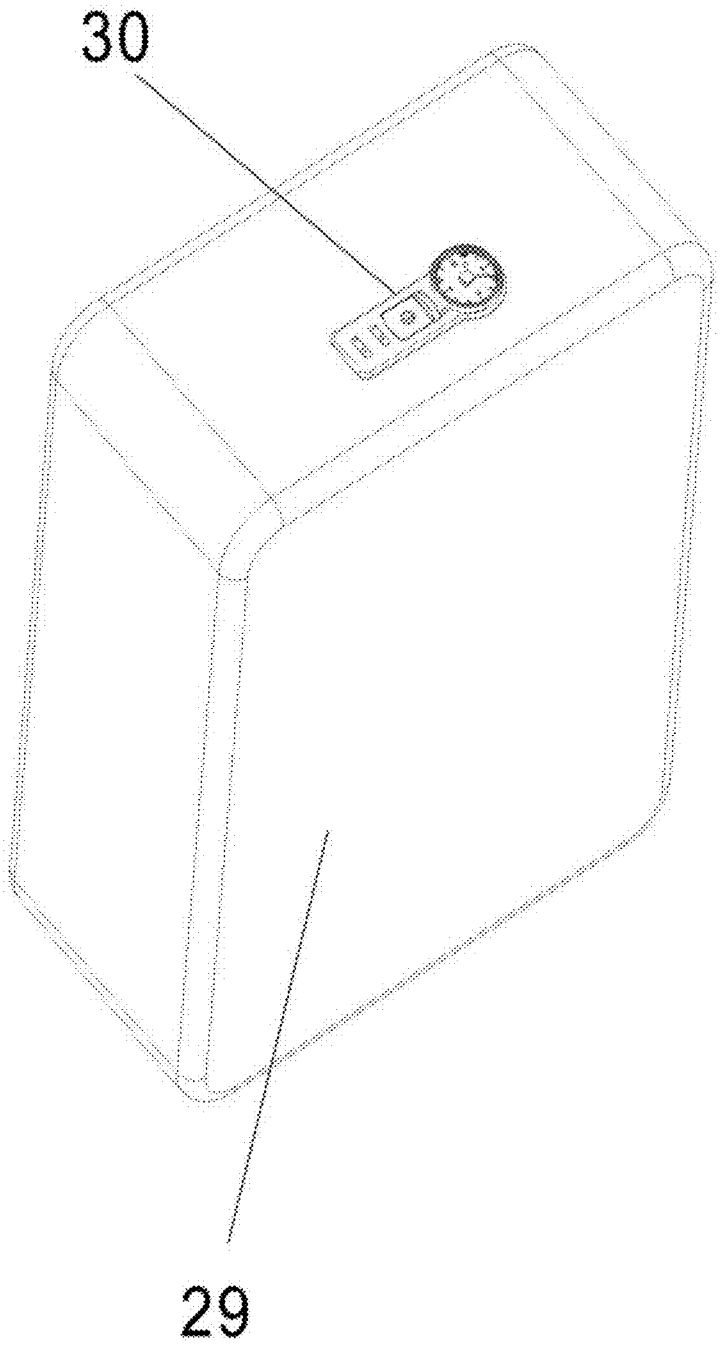
FIG. 1 is the stereogram for a box and a pointer type combination lock.

Reference signs: 1: Top cover; 2: Lock core; 3: Dial; 4: Pointer A; 5: Pointer B; 6: Gear ring; 7: Clutch; 8: Unlocking key; 9: Latch; 10: Back cover; 11: Lock disc A; 12: Drive shaft B; 13: Slider; 14: Lock core stopper; 15: Latch connecting handle; 16: Notch A; 17: Drive shaft A; 18: Planetary gear; 19: Sun gear; 20: Lock disc B; 21: Occlusal boss B; 22: Drive phase tooth B; 23: Drive phase tooth A; 24: Notch B; 25: Occlusal boss A; 26: Dial cover; 27: Drive shaft A pointer connecting end; 28: Lock disc phase tooth A; 29: Box body; 30: Pointer type combination lock; 31: Lock disc phase tooth A; 32: Drive shaft A extension end.

DETAILED DESCRIPTION OF THE INVENTION

The exemplary embodiments of the invention are described in detail with reference to the drawings. These exemplary embodiments are provided for ensuring that the invention can be clearly understood by ordinary technicians in the field and can be implemented according to the description herein. The drawings and embodiments are not intended to limit the invention, and the scope of the invention is limited by the claims.

The pointer type combination lock can be applied to bags, room doors, cabinet doors and other products. The combination lock is a more commonly used and mature product. Personnel in the field easily understand and think of the general internal structure of the pointer type combination lock. The conventional part is not described, and the embodiment only describes the new creation points of the invention in detail.

Embodiment 1

As shown in FIG. 1, FIG. 4, FIG. 5 and FIG. 9, a pointer type combination lock box comprises a box body (29) and a pointer type combination lock (30), wherein the pointer type combination lock is installed on the box body and comprises an unlocking key (8), a latch (9), a slider (13), a clutch (7), a dial (3), a pointer A (4), a pointer B (5), a lock disc A (11), a lock disc B (20), a drive shaft A (17) and a drive shaft B (12), the dial is provided with scale marks and or symbol marks, the pointer A is connected with the drive shaft B, the drive shaft B is connected with the lock disc B, the pointer B is connected with the drive shaft A, the drive shaft A is connected with the lock disc A, the drive shaft A is provided with an occlusal boss A, the drive shaft B is provided with an occlusal boss B, interstitial occlusion is adopted between the occlusal boss A and the occlusal boss B, the drive shaft A is provided with a drive phase tooth A, the drive shaft B is provided with a drive phase tooth B, the lock disc A is provided with a lock disc phase tooth A, the lock disc B is provided with a lock disc phase tooth B, the drive phase tooth A is separated from or occluded with the lock disc phase tooth A through the clutch, the drive phase tooth B is separated from or occluded with the lock disc phase tooth B through the clutch, the latch is connected with the unlocking key, the unlocking key is connected with the slider, and the combination of the scale marks or symbol marks on the dial that the pointer A and the pointer B respectively point to by turning the drive shaft A forwardly and reversely is an unlocking code;

For unlocking, the gear ring is rotated to drive the planet gear, the planet gear drives the sun gear, the sun gear 1 drives the drive shaft B for rigid connection, the drive shaft B drives the drive shaft A, and the combination of the scale marks or symbol marks on the dial that the pointer A and the pointer B respectively point to by turning the drive shaft A forwardly and reversely is an unlocking code.

The dial is preferably a watch dial, and three pointers can be used to combine tens of thousands of groups of codes; if hours, minutes and seconds are the unlocking codes, 12 scales are provided for the hour hand, 60 scales are provided for the minute hand and the second hand, and there are a total of 43,200 (12*60*60) groups of codes, which is very difficult to crack; however, the hour hand does not only point to the hour; in fact, 60 scales are provided for the hour hand, and there are a total of 216,000 (60*60*60) groups of codes for three pointers; 24 scales are set for each pointer in actual use, that is, if the hour hand move by a scale every half hour, the minute hand and the second hand are similar; for bag products, there are a total of 576 (24*24) groups of codes for two pointers, and there are a total of 13,824 (24*24*24) groups of codes for three pointers, so that the total number of codes is enough, the confidentiality is high, and the cracking difficulty is high;

For the traditional (mechanical) combination lock for the safe box, the scale marks and number symbols cannot visually display the complete code; the unlocking method is as follows: generally use an indicating arrow three-level code, first turn in one direction to a certain number or scale, at this time must remember the number, reversely turn to a number or scale and remember the number, and the last number cannot be shown; forwardly turn to a number or scale, and the last two numbers cannot be shown; it wrong numbers are entered, the user cannot know whether the first step wrong or the second step is wrong and have to unlock again from the beginning, making trouble during use;

The invention perfectly solves the defect; for unlocking, first rotate the first pointer in one direction to align with a certain value (for example, a hour hand aligns with an hour scale), then reversely rotate the second pointer to align with a certain value (for example, a minute hand aligns with a minute scale); at this point, the first unlocking code does not change and continues to be maintained; then forwardly turn the third pointer to align with a certain value (for example, a second hand aligns with a second scale); at this point, the first unlocking code and the second unlocking code do not change and continue to be maintained; the entire unlocking code is set and visually displayed; if one place is wrong, just go back to modify the pointer position.

Figure 4:
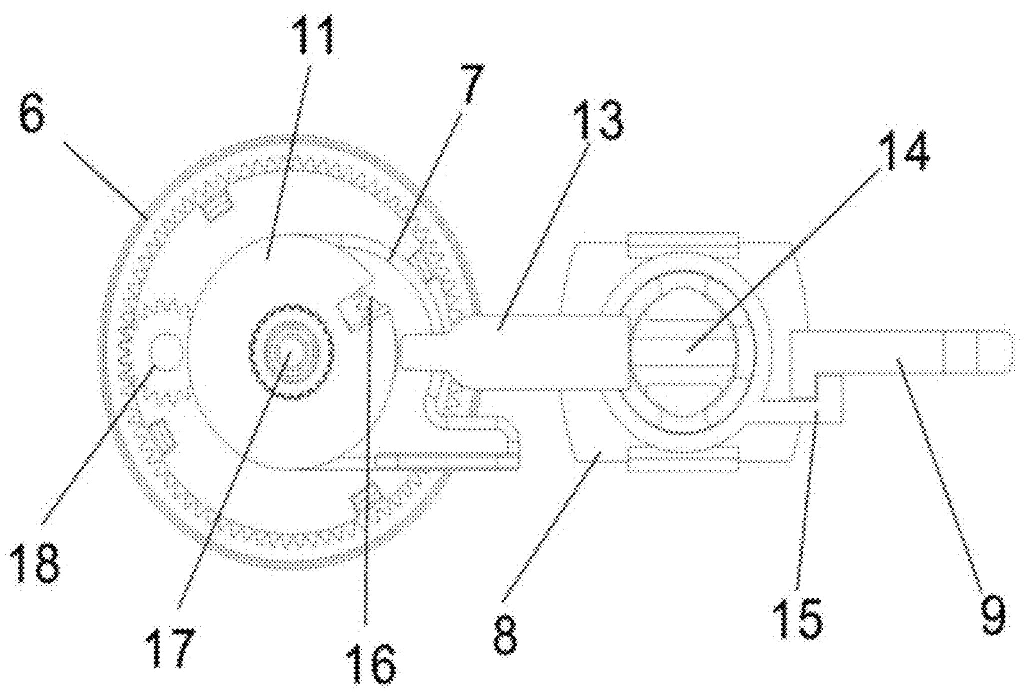
FIG. 4 is the rear view for an internal structure of a pointer type combination lock.
Figure 5:
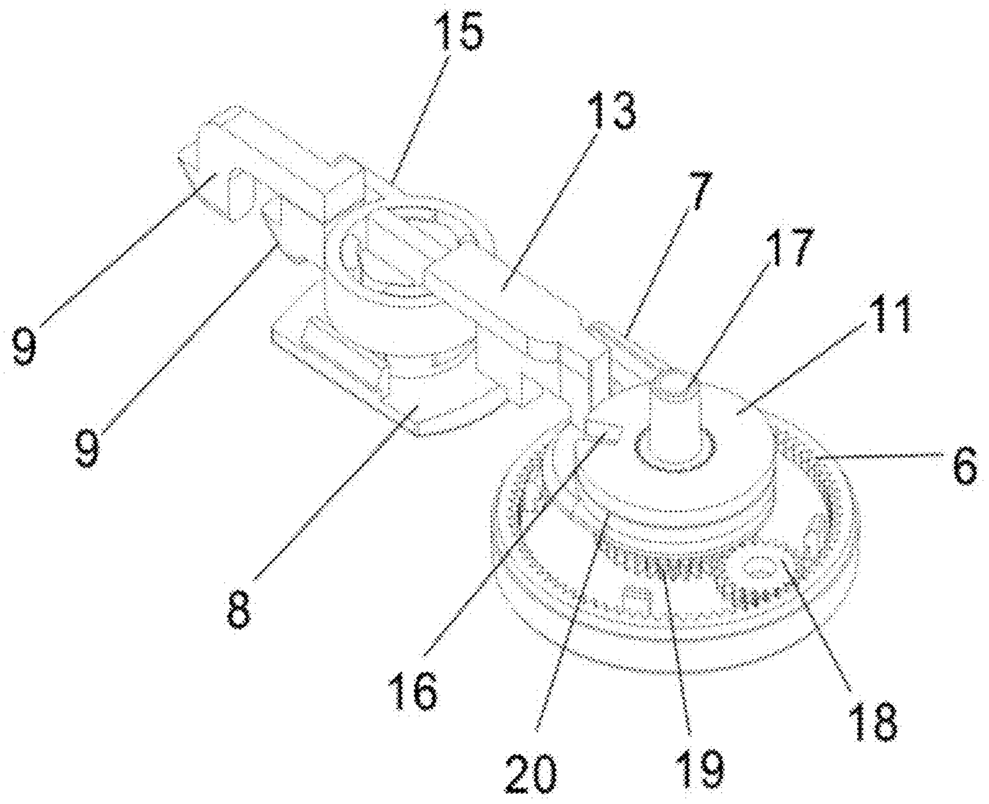
FIG. 5 is the stereogram 1 for an internal structure of a pointer type combination lock.
Figure 9:
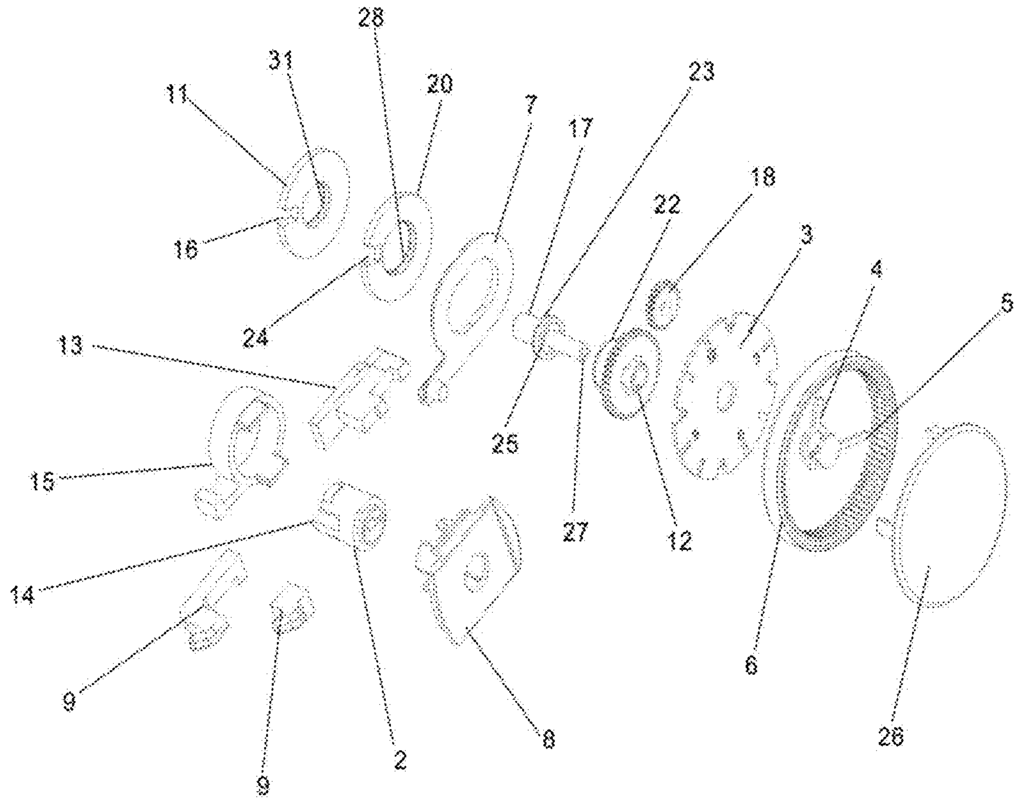
FIG. 9 is the explosive view 1 for an internal structure of a pointer type combination lock.

The operating principle is shown in FIG. 4, FIG. 5 and FIG. 9, and the pointers and the lock discs are respectively connected to the sun gears and the drive shafts; if a group of pointers, the lock discs and the drive shafts are added, the number of codes will be increased by a series; in fact, three pointers are enough to use, and too many pointers increase structural complexity and volume, which is unnecessary; the drive shaft A and the drive shaft B are concentric, one end of the drive shaft B (12) is connected with the pointer A (4) and the other end thereof is connected with the lock disc B (20), one end of the drive shaft A (17) is connected with the pointer B (5) and the other end thereof is connected with the lock disc A (11), the notch B (24) is arranged on the lock disc B (20), and the notch A (16) is arranged on the lock disc A (11);

First turn the gear ring in one direction (such as clockwise), drive the sun gear to rotate until the occlusal boss B (21) is occluded with the occlusal boss A (25), further drive the drive shaft A (17) to rotate, the pointer B (5) connected to one end of the drive shaft A (17) is linked with the lock disc A (11) connected to the other end of the drive shaft A (17), and the pointer B (5) corresponds to the notch A (16); at this time, the value indicated by the pointer B (5) is the first unlocking code; then reversely (counterclockwise) rotate the gear ring, drive the occlusal boss B (21) to be separated from the occlusal boss A (25); at this time, only the drive shaft B (12) rotates, and the drive shaft A (17) is stationary; rotate the drive shaft B (12) to a certain position, then the pointer A (4) corresponds to the notch B (24); at this time, the value indicated by the pointer A (4) is the second unlocking code; if another pointer is added, forwardly (clockwise) turn to set the first code, and then reversely (counterclockwise) turn to set the second code; at this time, the combination of values indicated by the three pointers is the unlocking code.

Figure 2:
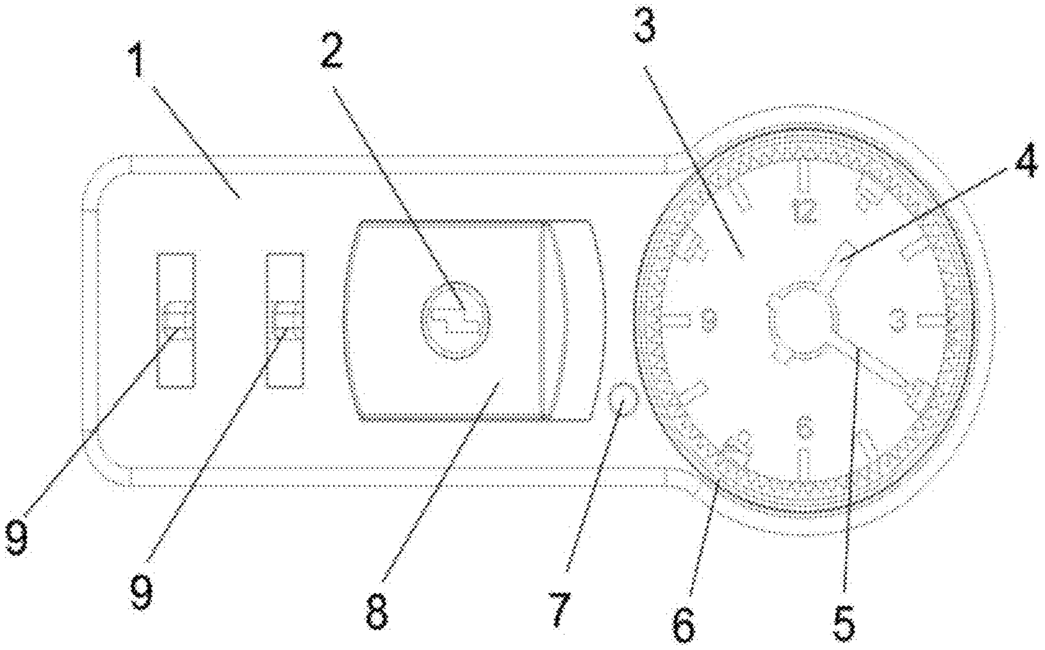
FIG. 2 is the main view for a pointer type combination lock.
Figure 3:
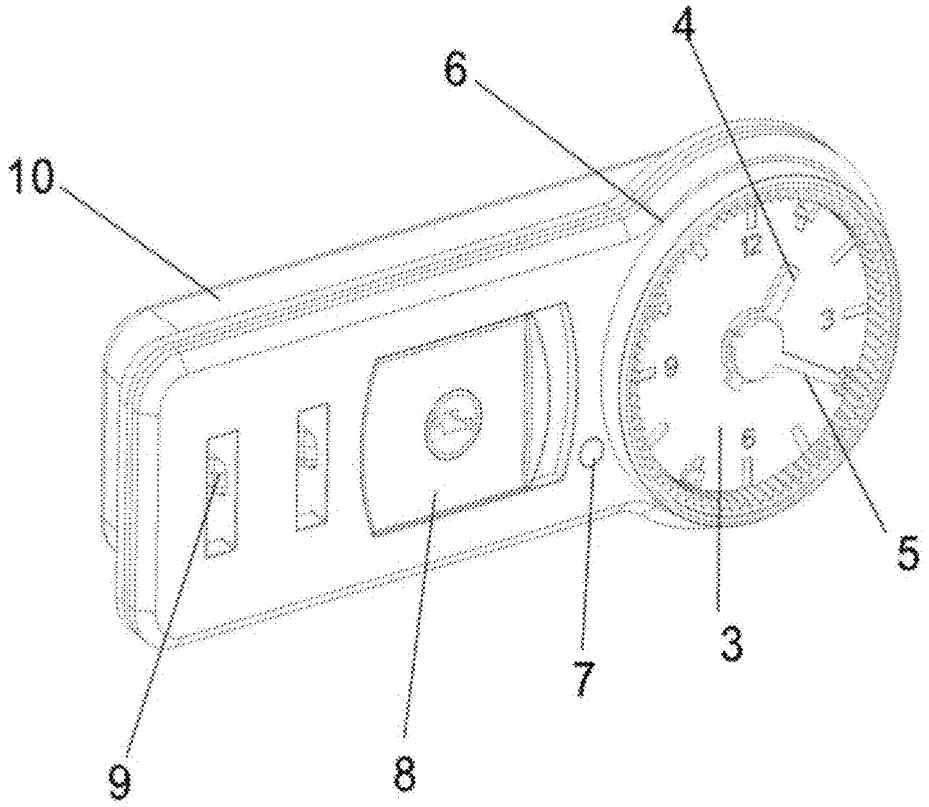
FIG. 3 is the stereogram for a pointer type combination lock.

As shown in FIG. 2, the dial is provided with scale marks and or symbol marks, the symbol mark can be expressed in Arabic numerals or Roman numerals or letters, etc., normally in Arabic numerals or Roman numerals.

As shown in FIG. 2, two or more pointers are arranged, the combination of scale marks and/or symbol marks that a plurality of pointers point to is the displayed code; twenty past one is displayed in the drawing, namely, the current code.

Figure 6:
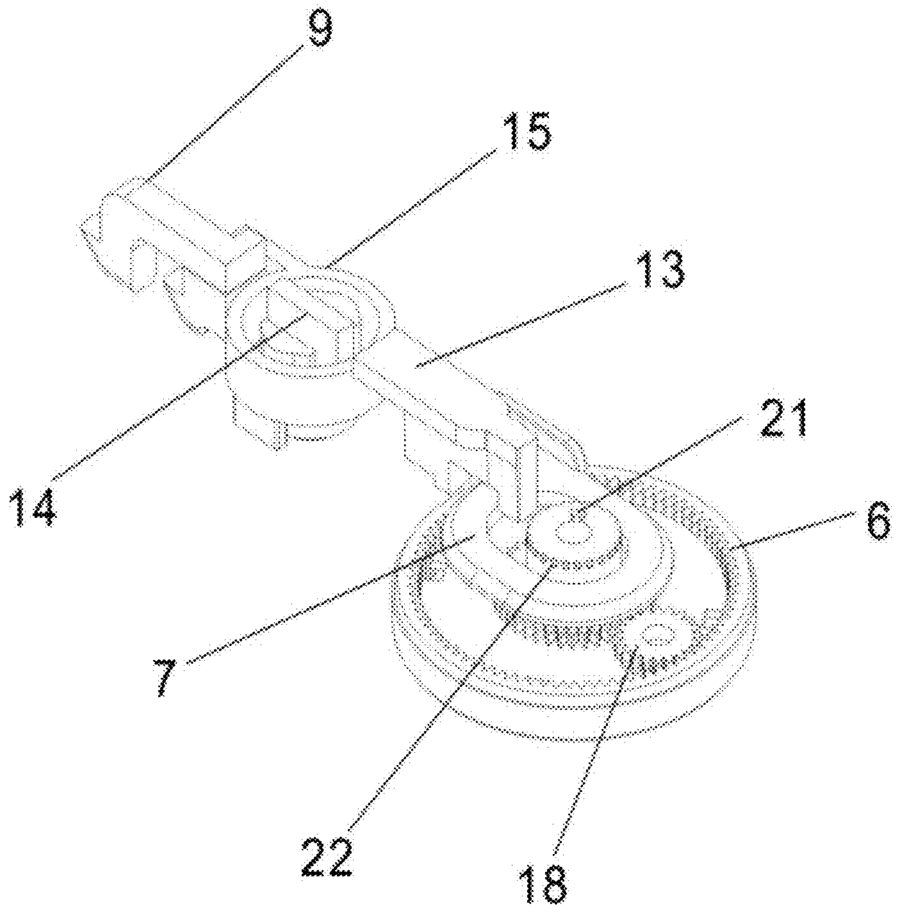
FIG. 6 is the stereogram 2 for an internal structure of a pointer type combination lock.
Figure 7:
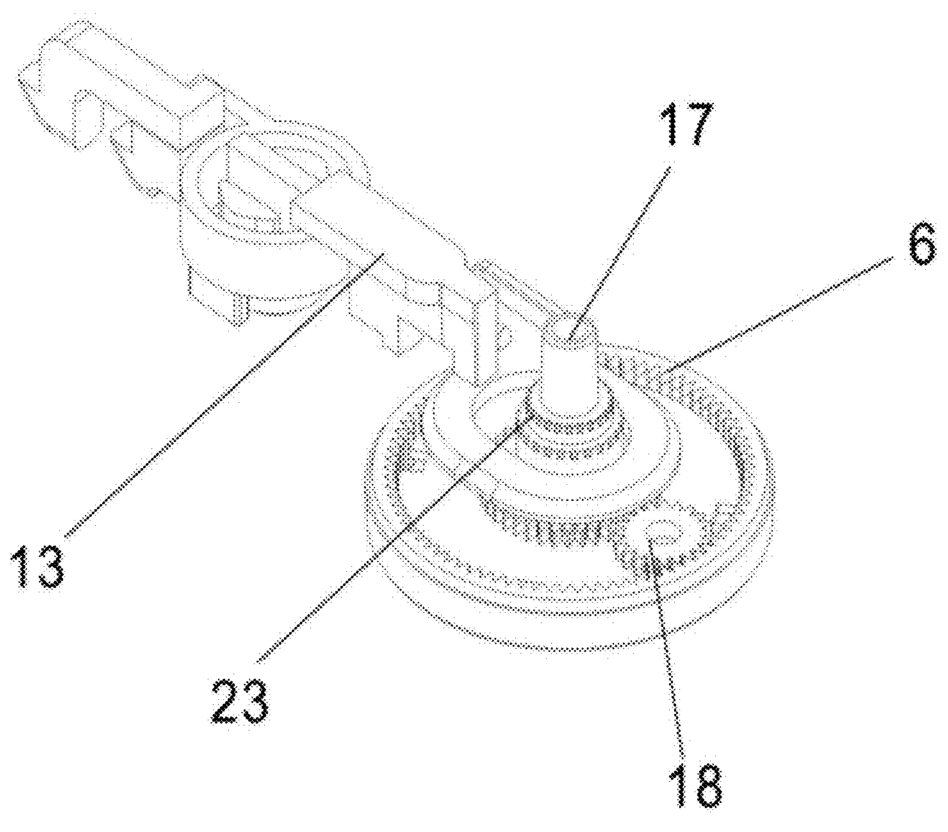
FIG. 7 is the stereogram 3 for an internal structure of a pointer type combination lock.
Figure 8:
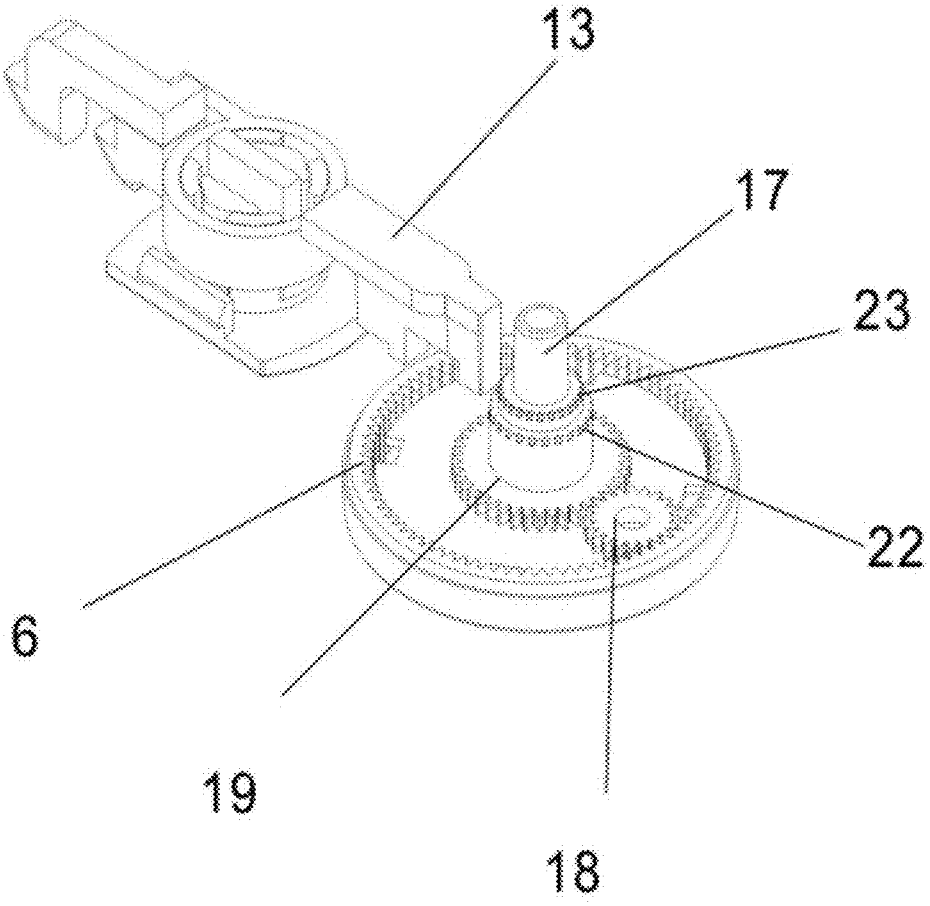
FIG. 8 is the stereogram 4 for an internal structure of a pointer type combination lock.

As shown in FIG. 5, FIG. 6 and FIG. 7, the code is changed to the button or knob type, and most of the bags use the button type; when the combination lock is unlocked, the code change device is restricted by the slider; press the clutch (7), then the code change device separates the lock discs (20, 11) from the drive shaft B (12) and the drive shaft A (17); at this time, rotate the gear ring to drive the pointer to set a new code, and release the clutch (7), then the lock discs (20, 11) are recombined with the drive shaft B (12) and drive shaft A (17); at this time, the notches (16, 24) corresponds to the value that the new pointers (4, 5) point to, namely, the new unlocking code; the button or knob can be arranged outside or inside, which is generally arranged outside the bags for convenient use and arranged inside the doors and safe boxes for higher confidentiality and more safety; the principle is that the lock discs are separated from the pointers to change the notches and the phase of the pointers, a reset spring is arranged at the rear end of the lock disc, and the lock discs are re-occluded with the pointers under the action of the spring, that is, the unlocking code is changed.

As shown in FIG. 9, the number of phase teeth (22, 23, 28, 31) depends on the number of groups of codes used in an order to ensure accurate phase correspondence; otherwise, the code value can be infinitely subdivided, the phase transformation has no series, the fault tolerance is poor, and the use difficulty is high.

As shown in FIG. 2, the unlocking key is arranged as a toggle block or rotating handle; generally, the toggle block is arranged on the bag, the rotating handle is arranged on the door, and the principle is that the latch is driven for unlocking by pushing or rotating; a lock core can also be arranged to unlock through a key, for example, the customs lock commonly used on the bag can be unlocked through the key regardless of right or wrong code; the lock core can also be arranged on the room door to prevent from forgetting the code and can be unlocked through the key, and the principle is the same as the bag customs lock, that is, the connection between the slider (13) and the unlocking key (8) is removed, and the slider loses the limiting effect on an unlocking device.

Embodiment 2

Figure 10:
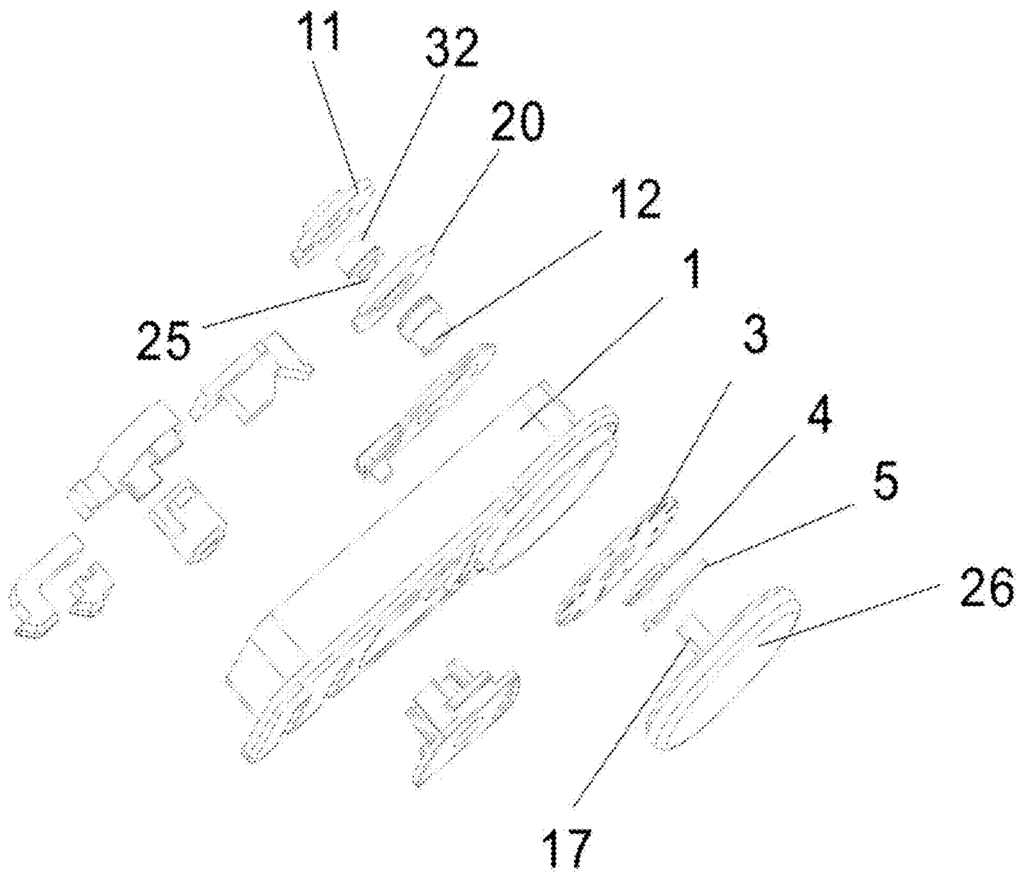
FIG. 10 is the explosive view 2 for an internal structure of a pointer type combination lock.
Figure 11:
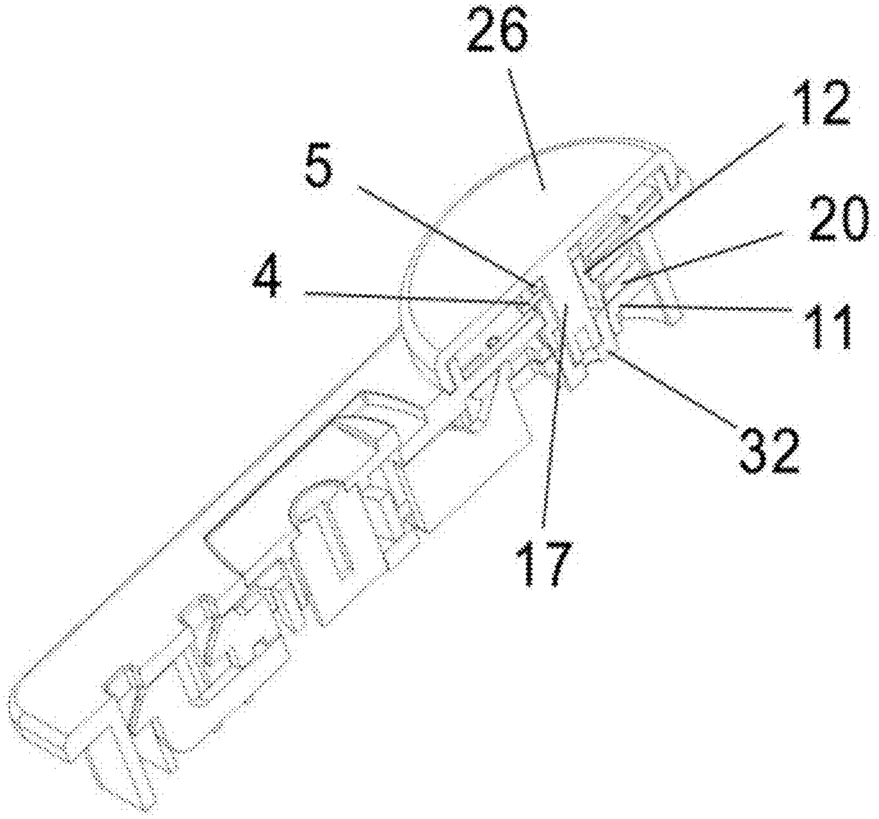
FIG. 11 is the stereoscopic profile for a pointer type combination lock.

As shown in FIG. 10 and FIG. 11, the drive shaft A (17) and the dial cover (26) are integrated, the drive shaft A is directly driven by the dial cover, the pointer B (5) is directly fixed on the drive shaft A, the drive shaft A extension end (32) is a part of the drive shaft A, and the drive shaft A extension end (32) is rigidly connected with the drive shaft A (17) by screws; at the same time, the dial cover is also connected to the top cover (1) so that the dial cover can be rotated without separation, the drive shaft extension end is connected with the lock disc A (11), and the drive shaft B (12) is driven by the occlusal boss A (25) arranged on the drive shaft extension end and is connected with the lock disc B (20), and the of the scale marks or symbol marks on the dial that the pointer A and the pointer B respectively point to by turning the drive shaft A forwardly and reversely is an unlocking code.

As shown in FIG. 5, when the notch A (16) and the notch B (24) are aligned with the slider (13), the unlocking key (8) is pushed to drive the latch (9) for unlocking; otherwise, the lock disc prevents the slider from moving, and the unlocking key is locked, and unlocking cannot be realized.

The above embodiments are only preferred embodiments of the invention and are not intended to limit the invention. For the technicians in the field, the invention may be subject to various changes and variations. Any modification, equivalent substitution, improvement, etc. made within the spirit and principles of the invention should fall within the scope of protection of the invention.

The invention claimed is:

1. A pointer type combination lock box, characterized by comprising a box body and a pointer type combination lock, wherein the pointer type combination lock comprises an unlocking key, a latch, a slider, a clutch, a turntable, a dial, a pointer A, a pointer B, a lock disc A, a lock disc B, a drive shaft A and a drive shaft B, the dial is provided with scale marks and or symbol marks, the pointer A is connected with the drive shaft B, the drive shaft B is connected with the lock disc B, the pointer B is connected with the drive shaft A, the drive shaft A is connected with the lock disc A, the drive shaft A is provided with an occlusal boss A, the drive shaft B is provided with an occlusal boss B, interstitial occlusion is adopted between the occlusal boss A and the occlusal boss B, the drive shaft A is provided with a drive phase tooth A, the drive shaft B is provided with a drive phase tooth B, the drive phase tooth A is separated from or occluded with a lock disc phase tooth A through the clutch, the drive phase tooth B is separated from or occluded with a lock disc phase tooth B through the clutch, the latch is connected with the unlocking key, the unlocking key is connected with the slider, the turntable is arranged as a gear ring or a dial cover, and the combination of the scale marks or symbol marks on the dial that the pointer A and the pointer B respectively point to by turning the turntable forwardly and reversely is an unlocking code.

2. The pointer type combination lock box according to claim 1, characterized in that the gear ring is connected with a planetary gear, and the planetary gear is connected with a sun gear, and the drive shaft B is rotated by rotating the gear ring.

3. The pointer type combination lock box according to claim 1, characterized in that the dial cover is fixedly connected with the drive shaft A, and the drive shaft A is rotated by rotating the dial cover.

4. The pointer type combination lock box according to claim 1, characterized in that the drive shaft A and the drive shaft B are arranged as concentric shafts, and are interstitially driven by the occlusal boss A and occlusal boss B.

5. The pointer type combination lock box according to claim 1, characterized in that the symbol marks are numbers or letters or text patterns.

6. A pointer type combination lock, characterized by comprising an unlocking key, a latch, a slider, a clutch, a turntable, a dial, a pointer A, a pointer B, a lock disc A, a lock disc B, a drive shaft A and a drive shaft B, the dial is provided with scale marks and or symbol marks, the pointer A is connected with the drive shaft B, the drive shaft B is connected with the lock disc B, the pointer B is connected with the drive shaft A, the drive shaft A is connected with the lock disc A, the drive shaft A is provided with an occlusal boss A, the drive shaft B is provided with an occlusal boss B, interstitial occlusion is adopted between the occlusal boss A and the occlusal boss B, the drive shaft A is provided with a drive phase tooth A, the drive shaft B is provided with a drive phase tooth B, the drive phase tooth A is separated from or occluded with a lock disc phase tooth A through the clutch, the drive phase tooth B is separated from or occluded with a lock disc phase tooth B through the clutch, the latch is connected with the unlocking key, the unlocking key is connected with the slider, the turntable is arranged as a gear ring or a dial cover, and the combination of the scale marks or symbol marks on the dial that the pointer A and the pointer B respectively point to by turning the turntable forwardly and reversely is an unlocking code.

7. The pointer type combination lock according to claim 6, characterized in that the gear ring is connected with a planetary gear, and the planetary gear is connected with a sun gear, and the drive shaft B is rotated by rotating the gear ring.

8. The pointer type combination lock according to claim 6, characterized in that the dial cover is fixedly connected with the drive shaft A, and the drive shaft A is rotated by rotating the dial cover.

9. The pointer type combination lock according to claim 6, characterized in that the drive shaft A and the drive shaft B are arranged as concentric shafts, and are interstitially driven by the occlusal boss A and occlusal boss B.

10. The pointer type combination lock according to claim 6, characterized in that the symbol marks are numbers or letters or text patterns.

* * * * *